United States Patent [19]

Rafferty

[11] 4,030,311

[45] June 21, 1977

[54] METHOD AND APPARATUS FOR ADJUSTABLY SUPPORTING A PIPELINE RELATIVE TO A LAY VESSEL

[75] Inventor: Andrew J. Rafferty, Houston, Tex.

[73] Assignee: Brown & Root, Inc., Houston, Tex.

[22] Filed: Jan. 19, 1976

[21] Appl. No.: 650,530

[52] U.S. Cl. .................................. 61/108; 61/111; 214/1 P

[51] Int. Cl.² .......................................... F16L 1/00

[58] Field of Search ................. 61/72.3, 72.1, 72.2, 61/105, 107–111; 214/1 P; 114/.5 R, .5 D

[56] References Cited

UNITED STATES PATENTS

| 707,951 | 8/1902 | Alexander | 214/1 P X |
|---|---|---|---|
| 3,217,900 | 11/1965 | Kupetzky et al. | 214/1 P |
| 3,436,895 | 4/1969 | Pearne et al. | 214/1 P X |
| 3,487,648 | 1/1970 | Lawrence | 61/72.3 |
| 3,491,541 | 1/1970 | Berard | 61/72.3 |
| 3,720,069 | 3/1973 | Lockridge | 61/108 X |
| 3,775,985 | 12/1973 | Shaw | 61/72.3 |
| 3,779,023 | 12/1973 | Koppers | 61/45 D |
| 3,785,506 | 1/1974 | Crocker et al. | 214/1 P |
| 3,807,588 | 4/1974 | Bickham | 241/1 P X |
| 3,860,122 | 1/1975 | Cernosek | 61/110 X |
| 3,874,734 | 4/1975 | Plerak et al. | 61/45 D |
| 3,916,500 | 11/1975 | Brown | 214/1 P X |

Primary Examiner—Dennis L. Taylor
Attorney, Agent, or Firm—Kenway & Jenney

[57] ABSTRACT

A shoe for adjustably supporting a pipeline relative to a ramp of a lay vessel is comprised of a cradle which supports the pipeline in longitudinally movable relation with the ramp. The cradle contacts the pipeline intermediate the longitudinal axis of the pipeline and the surface of the ramp. An elongated lever is pivotally connected at one extreme to the ramp and at another extreme to the cradle. The elongated lever is rotated by rotating means about the pivotal connection with the surface of the ramp to alternately raise and lower the cradle and thereby adjustably support the pipeline relative to the ramp.

According to the method of the invention, a pipeline can be adjustably supported relative to a ramp of a lay vessel by first cradling the pipeline above the surface of the ramp in longitudinally movable relation therewith. This step may be accomplished by a cradle having two degrees of freedom relative to the ramp and pivotally connected thereto through an elongated lever. The cradle can be raised or lowered to adjustably support the pipeline relative to the ramp of the vessel by rotating the elongated lever.

10 Claims, 7 Drawing Figures

METHOD AND APPARATUS FOR ADJUSTABLY SUPPORTING A PIPELINE RELATIVE TO A LAY VESSEL

BACKGROUND OF THE INVENTION

The present invention relates generally to a method and apparatus for adjustably supporting a pipeline relative to a ramp of a lay vessel. More particularly, the invention relates to a method and apparatus which can be employed to vary the vertical elevation of a pipeline relative to the ramp of a lay vessel to maintain a suitable curvature in the pipeline as it passes from the ramp to an associated stinger.

In recent years a great deal of commercial acitivity has begun focusing on the oceans. In particular, as supplies of petroleum indigenous to the major industrial countries have diminished and the countries having significant surplus reserves have become more nationalistic, exploration of the geological strata underlying the oceans has intensified. Such exploration is continuing and at present is being pressed into ever deeper areas of the oceans.

Oil fields discovered beneath the oceans must be serviced to remove the oil produced. Commonly, pipelines are laid on the ocean floor and are used to convey the oil from place to place. These pipelines are often put in place by means of specialized vessels referred to as lay vessels. The pipelines are often enormous both dimensionally and in weight and stretch over greatly varying terrain and depths.

At least three different types of lay vessels are currently in use. One type is commonly referred to as a barge hull. This type of vessel is large and shallow in draft. A second type is referred to as a ship hull. These vessels may be ships which have been converted for the express purpose of laying pipe or may be of entirely new construction. The third type of vessel in common use is referred to as a seim-submersible. This vessel entails elongated, horizontal pontoons and vertical stabilizing columns and is quite stable in heavy seas.

While the three different types of lay vessels differ considerably in overall configuration, several structural and operational characterisitics are common to each. All commonly assemble the pipeline on board from relatively short segments of pipe supplied by a smaller servicing vessel. All entail a lengthy ramp along which the pipeline moves longitudinally as it is being made up and put in place on the floor of the body of water. All three types of vessels normally employ a stinger trailing from the stern to assist in supporting and reducing the free-standing depth, i.e., the unsupported length, of the pipeline as it passes from the ship to the floor of the body of water. By reducing the free-standing depth of the pipeline, there is less tendency for the pipeline to buckle.

Various ramps, each differing principally in configuration, may be employed in each of the three different types of vessels. The most common types of ramps are those which are horizontal, slightly inclined relative to the main deck of the vessel, or gently curving in a concave, downward manner. These different types of ramp commonly extend along the side of the lay vessel. Due to the number and degree of separation of stations frequently required in constructing a pipeline, e.g., six to eight stations located at roughly 40-foot intervals, a ramp is normally quite long.

Stingers commonly employed to support a pipeline extend from the end of the ramp adjacent the stern of the lay vessel downwardly into the water. The joint connecting the stinger to the vessel affords articulation in at least a vertical plane. The length and inclination of the stinger relative to the vessel and ramp is dependent upon the structural characteristics of the pipe and various environmental factors including the depth of the water.

It is of great importance that the pipeline be properly supported at each of the various stations along the ramp. For instance, it can be appreciated that each successive length of pipe added to the pipeline must be accurately aligned with the preceding segment. Additionally, it may be useful to X-ray the welds joining individual segments of pipe to check for structural soundness. This operation may require accurate positioning of the pipeline. These functions may be facilitated by support shoes disposed periodically along the ramp.

Perhaps most importantly the curvature of the pipeline as it passes from the ramp to the stinger must be carefully controlled to avoid buckling. The overall configuration of this curve along the ramp and stinger of the lay vessel is commonly a function of the inclination of the stinger and the depth of the water in which the pipeline is being laid. The curvature necessary to avoid buckling of the pipeline as it passes onto the stinger can be maintained in part by raising and lowering the pipeline relative to the ramp to vary the degree and extent of the curve. The support shoes mentioned earlier are thus also useful in controlling the curvature of the pipeline.

Each of the support shoes is commonly independent of the others. Individually, the support shoes vary the elevation of various points of the pipeline above the ramp and thereby collectively regulate the curvature of the pipeline. By independently varying the elevation at which each support shoe supports the pipeline, the curvature thereof can be shifted to some extent along the ramp of the lay vessel and the sharpness of the transition from the ramp to the stinger can be controlled.

The individual shoes commonly in use are installed in the ramp at various points and each generally entail some sort of supportive trough or cradle which fits under the pipeline above the ramp of the lay vessel. The cradle of each support shoe is generally supported by a stanchion assembly consisting of a hydraulic cylinder guided by a telescopic sleeve. Support shoes of this and several other types have for various reasons not been entirely successful and have presented a number of serious problems.

A major problem encountered in connection with support shoes of the prior art is that the installation of the supportive stanchions associated with these devices has necessitated the formation of an opening in the ramp. The body of the stanchion is generally inserted in the opening and then anchored. This is perhaps most often true in the case of a support shoe in which the supportive stanchion is formed by a hydraulic cylinder and guide sleeve assembly. The disposition of the supportive stanchion in an opening in the ramp presents a difficult problem with regard to access to the stanchion. Workmen may be hampered in servicing, repairing, or replacing a support shoe of this type. The existence of an opening in the ramp may also allow a vessel to take on water or at least will form cavities tending to catch and retain water. This phenomenon would be a particular problem in areas such as the North Sea where weather can be quite rough.

The pipelines which are laid by a lay vessel are often enormous not only in size but in weight as well. Thus, loads of considerable magnitude may be applied to a cradle of a support shoe and ultimately to the supportive stanchions associated with the cradle. The matter is further complicated by the fact that a pipeline is often placed in tension to allow a decrease in the length of the stinger in use and a corresponding increase in the free-standing height of the pipeline. The enormous weight and loading applied in tensioning the pipeline thus may impose large normal loads on the cradle or trough supporting the pipeline. Thus, considerable amounts of drag or resistance to the longitudinal movement of the pipeline along the cradles may be developed.

The drag or resistance developed upon movement of the pipeline may be exerted in an essentially orthogonal manner relative to a supportive stanchion and may thus development significant bending moments therein. Bending moments of this character when combined with the large loading resulting from the weight or tensioning of the pipeline may precipitate the failure of a supportive stanchion. The failure of a support shoe in this manner might well result in the buckling or fracture of the pipeline.

A further problem which may be a corollary of that just discussed resides in the lateral instability of the support shoes, that is, the tendency of the support shoes to deflect in directions transverse to the longitudinal axis of the ramp. Support shoes employing hydraulic cylinder and guide sleeve assemblies as the supportive stanchions may be particularly subject to this problem. A lay vessel may be subjected to considerable buffeting in heavy seas particularly in inhospitable areas such as the North Sea. Considering this buffeting and the great weight of the pipeline, and the tensioning, thereof, it will be appreciated that the lateral instability of the support shoes may present a very serious problem. Not only does lateral instability render the stanchions vulnerable to buckling, but the accurate alignment or positioning of the pipeline at various stations along the ramp may be disrupted.

Many support shoes of the prior art afford a simple one-to-one ratio between the extension or contraction ot the telescopic stanchions and the resulting movement of the pipeline. A pipeline may require substantial variations in the elevation thereof above the ramp as the inclination of the associated stinger varies. Likewise, operations of the various stations along the ramp may require substantial alteration in the elevation of the pipeline. The problem is best phrased perhaps in terms of a deficiency in the degree to which the supportive stanchion can be extended or contracted to move the pipeline. In other words, in order to effect a sufficient change in the elevation of the pipeline an inordinately long telescopic stanchion may be required. Excessive length combined with high axial loads contributes greatly to lateral instability and the vulnerability of the assembly to buckling, particularly if the telescopic stanchion is comprised of a hydraulic cylinder and guide sleeve assembly. The length of a piston and cylinder assembly also presents problems in connection with the installation thereof in the ramp.

Many support shoes of the prior art may tend to develop excessive or unnecessary concentrations of stress in the ramp or the associated structural framing. This is particularly a problem in connection with support shoes entailing vertically telescopic stanchions. In these devices only a limited area may be available for contacting the ramp or associated structural framing and as a result undue stress concentrations may be developed. These stress concentrations may generally be of a cyclic character and are therefore potentially quite damaging.

Each vessel and each ramp of the various types has different structural characteristics which must be accommodated in installing support shoes. This is true whether the support shoes are installed during construction of the vessel or in replacing shoes on an older vessel. Because of factors relating to shape and mode of operation, many support shoes of the prior art of necessity penetrate the surface of the ramp or otherwise require special adaptations of the normal structure of the ramp. Each support shoe of the prior art thus may not constitute a complete unit in itself. Thus, the support shoe is not modular in the sense that it could be secured directly to the surface of the ramp without the need of any special structural adaptation of the lay vessel. Furthermore, support shoes of the prior art which cannot be assembled directly on the surface of the ramp may not be sufficiently flexible to render them amenable to use in the full spectrum of vessels and ramps already in use. Lay vessels are extremely costly and the difficulties suggested in the preceding exacerbate this problem.

In most cases the enormous loading which may be exerted on a support shoe is received by a cradle and transmitted into a supportive stanchion through a simple pivot pin. In such arrangements there may exist insufficient bearing area for the pivot pin to transmit the loading without introducing undue wear or strain to the end of a stanchion. Furthermore, a joint employing a simple pivot pin may not afford proper centering of the cradle relative to the ramp and remaining portions of the support shoe. A joint of this type may also be difficult to repair or replace.

The problems suggested in the preceding, while not exhaustive, are among many which tend to reduce the effectiveness and desirability of support shoes of the prior art. Other noteworthy problems may also exist; however, those presented in the discussion above should be sufficient to demonstrate that support shoes appearing in the prior art have not been entirely satisfactory, particularly with regard to the various problems just discussed.

OBJECTS AND SUMMARY OF THE PREFERRED FORMS OF THE INVENTION

In light of the foregoing, it is therefore a general object of the invention to provide a novel support shoe intended to obviate or minimize problems of the type noted in the preceding.

It is a particular object of the invention to provide a method and apparatus for adjustably supporting a pipeline wherein the support shoe can be installed in a manner obviating the need for an opening in the ramp and concurrently affording adequate access to the shoe with no shipping of water.

It is another object of the invention to provide a novel method and apparatus for adjustably supporting a pipeline in which the pipeline may be raised and lowered hydraulically by hydraulic piston and cylinder assemblies which are loaded not flexurally, but rather in an entirely axial manner.

It is still another object of the invention to provide a novel method and apparatus for adjustably supporting a pipeline in which the pipeline is rigidly restrained in a lateral sense so as to afford accurate positioning of the pipeline and minimal opportunity for the supportive structure to fail.

It is yet still another object of the invention to provide a novel method and apparatus for adjustably supporting a pipeline in which the extent to which the elevation of the pipeline above the ramp is increased or decreased is a whole number multiple of the extent to which hydraulic piston and cylinder assemblies effecting the movement are extended or contracted.

It is a further object of the invention to provide a method and apparatus for adjustably supporting a pipeline in which the loads imposed by the pipeline are distributed into the ramp in a manner diminishing or largely eliminating stress concentrations.

It is still a further object of the invention to provide a novel method and apparatus for adjustably supporting a pipeline in which the supportive structure is modular in the sense that it can be applied directly to the ramp of the lay vessel without penetrating or otherwise requiring any adaptation of the ramp or the associated supportive structure.

It is yet still a further object of the invention to provide a method and apparatus for adjustably supporting a pipeline wherein the joint between a cradle and remaining portions of the support shoe affords sufficient bearing area for a pivot pin to avoid undue wear, centers the cradle relative to the ramp and remaining portions of the support shoe, and is susceptible to convenient repair or replacement.

A novel apparatus according to the invention is preferably comprised of a shoe which adjustably supports a pipeline relative to a ramp of a lay barge. The shoe is comprised of a cradle which contacts the pipeline intermediate the longitudinal axis of the pipeline and the surface of the ramp and which supports the pipeline in longitudinally movable relation therewith. An elongated lever is pivotally connected at one extreme to the ramp and at another extreme to the cradle. The elongated lever is rotated by hydraulic piston and cylinder assemblies about the pivotal connection with the ramp. In this manner the elongated lever alternately raises and lowers the cradle and thereby adjustably supports the pipeline relative to the ramp.

According to the method of the invention, a pipeline can be adjustably supported relative to a ramp of a lay barge by first cradling the pipeline above the surface of the ramp in longitudinally movable relation therewith. This step may be accomplished by a cradle having two degrees of freedom relative to the ramp and pivotally connected thereto through an elongated lever. The cradle can next be raised or lowered to adjustably support the pipeline relative to the ramp of the lay vessel by rotating the elongated lever.

THE DRAWINGS

Other objects and advantages of the invention will become apparent with reference to the detailed description to follow of a preferred embodiment thereof wherein like reference numerals have been applied to like elements and in which.

DETAILED DESCRIPTION

Brief Overview

Figure 1:
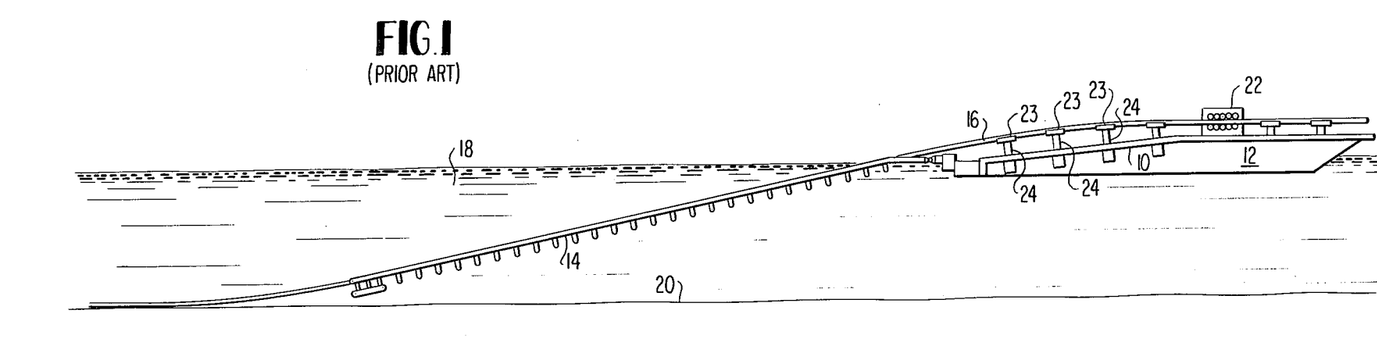
FIG. 1 is a side elevational view of a lay barge, stinger, and pipeline supported by schematically illustrated support shoes of the prior art.
Figure 2:
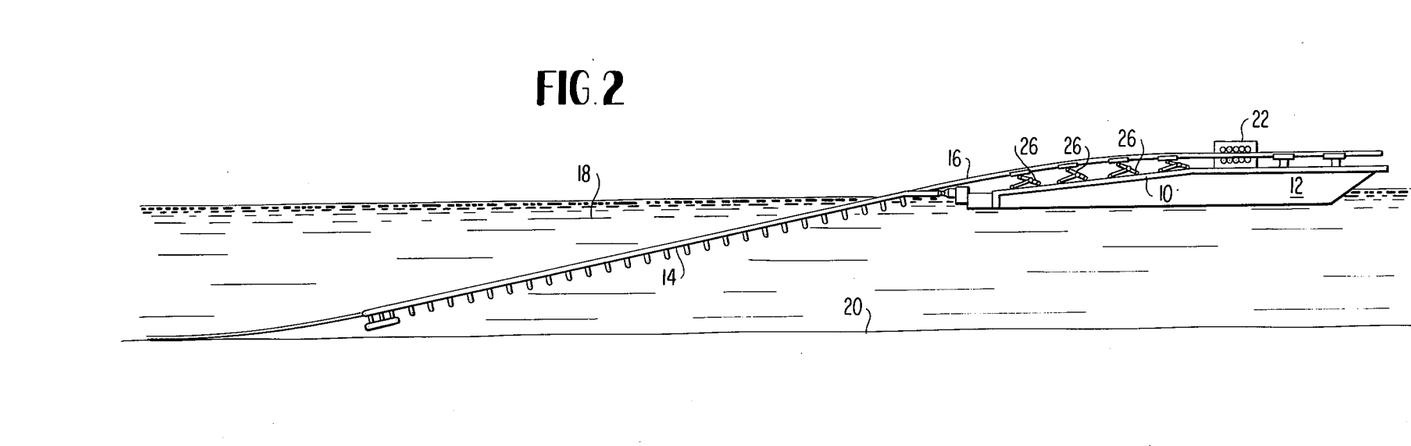
FIG. 2 is a side elevational view of a lay barge, stinger, and pipeline supported by schematically illustrated support shoes according to the present invention.

Referring now to FIGS. 1 and 2 of the drawings, examples of support shoes of the prior art can be contrasted with support shoes of the present invention as the support shoes would appear schematically in their operative environments. In both illustrations the support shoes are mounted on ramps 10 of lay vessels 12. The lay vessels in this case are of the type referred to as barge hull lay vessels so hereinafter the lay vessels will be referred to merely as lay barges. It should be emphasized, however, that the invention is also amenable to use with other lay vessels such as ship hull and semi-submersible lay vessels.

Attached to each lay barge is a stinger 14 which serves to support a pipeline 16 as it passes downwardly through a body of water 18 and onto a floor 20 of the body of water. The pipeline 16 is assembled on the ramp of the lay barge and in moving to the stinger 14 passes through a dynamic tensioner 22 which serves to tension the pipeline. Tensioning reduces the necessary length of the stinger and correspondingly increases the permissible free standing height of the pipeline from the floor of the body of water 20 to the point of the pipeline initially supported by the stinger.

As should be readily apparent from FIG. 1, support shoes of the prior art 24 each include a suitable member 23 which actually contacts the pipeline and a telescopic, vertically oriented stanchion 24 which interconnects the ramp of the lay barge and the member 23 contacting the pipeline. The stanchions 24 of these support shoes are commonly comprised of hydraulic cylinder and guide sleeve assemblies which extend through openings in the ramp. This aspect of the support shoes of the prior art is clearly illustrated in FIG. 1. As the pipeline 16 moves relative to the support shoes of the prior art, considerable drag is exerted on the portions thereof contacting the pipeline. It can be appreciated from FIG. 1 that drag developed may introduce bending moments of considerable magnitude in the upright stanchions supporting the pipeline.

As illustrated in FIG. 2, support shoes 26 according to the present invention fundamentally entail three structural elements: cradling means, elongated pivoting means, and rotating means. These features are only schematically illustrated in FIG. 2 and will be described in more detail in the course of subsequent discussion. It is nonetheless useful at this point to note that the support shoes of the invention rest on and are connected directly to the surface of the lay barge. No opening is required in the ramp to accommodate the invention. Furthermore, support shoes according to the present invention are constructed in such a way that bending moments developed in stanchion assemblies employed to move the pipeline are of minimal magnitude.

Though not absolutely essential to an understanding of the invention, it may be useful in terms of an appreciation of the invention to summarize briefly at this point the overall operation entailed in laying a pipeline using the equipment illustrated in FIG. 2.

The pipeline is assembled on the deck of the lay barge from segments of pipeline supplied by a service vessel. As the previously assembled pipeline moves into position on the floor of water, successive lengths of pipeline are moved by a conveyor or crane into position atop one or more of the support shoes. These support shoes facilitate the alignment and initial welding of the segment of pipe to the previously assembled pipeline. Once the welding is completed the lay barge may be advanced against the resistance afforded by the dynamic tensioner. As the lay barge advances, the pipeline moves across the support shoes in longitudinally moving relation with the ramp of the lay barge.

In the course of laying a pipeline it may be necessary to vary the inclination of the stinger relative to the lay barge. In order to preclude the possibility of buckling the pipeline, the curvature of the pipeline as it passes from the ramp of the lay vessel to the stinger may require adjustment. The support shoes arranged along the ramp thus can be used to raise and lower the pipeline to at least partially accommodate variations in the inclination of the stinger. Damage to the pipeline may thus be avoided.

Figure 3:
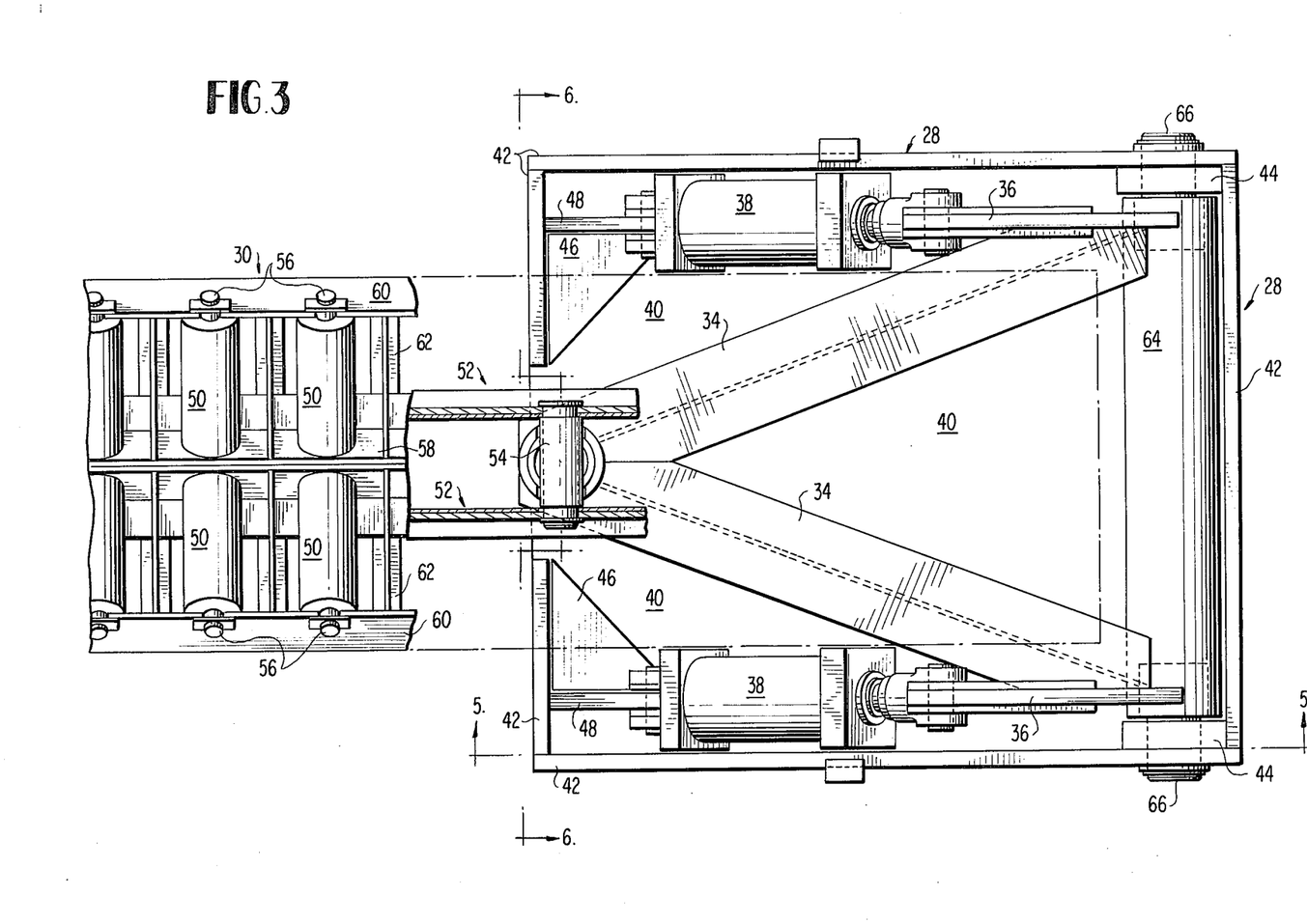
FIG. 3 is a plan view of a preferred embodiment of a support shoe according to the present invention with portions of the cradle thereof cut away.
Figure 4:
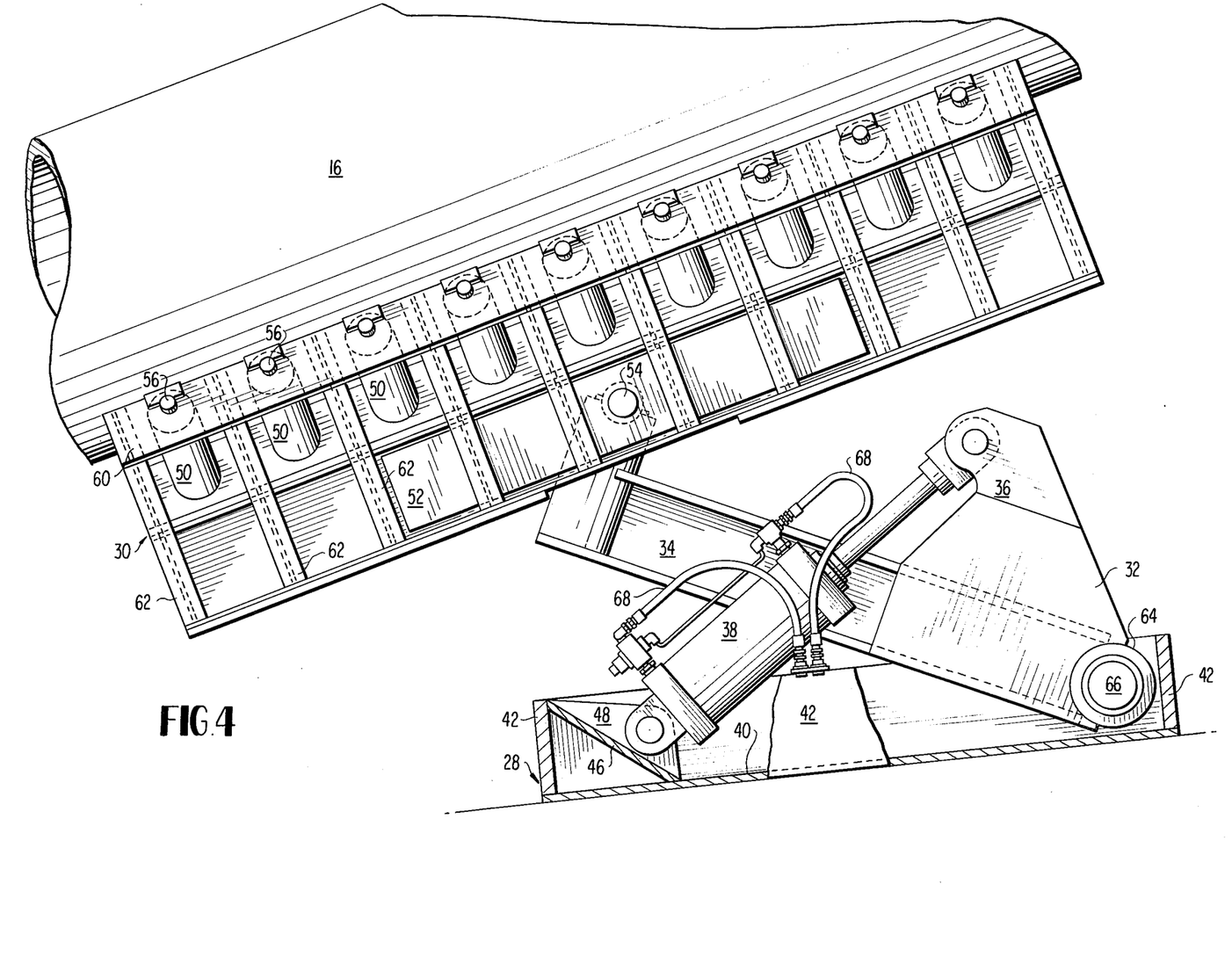
FIG. 4 is a partially sectional side view of a preferred embodiment of a support shoe according to the present invention in a raised condition with a pipeline resting on the cradle.
Figure 5:
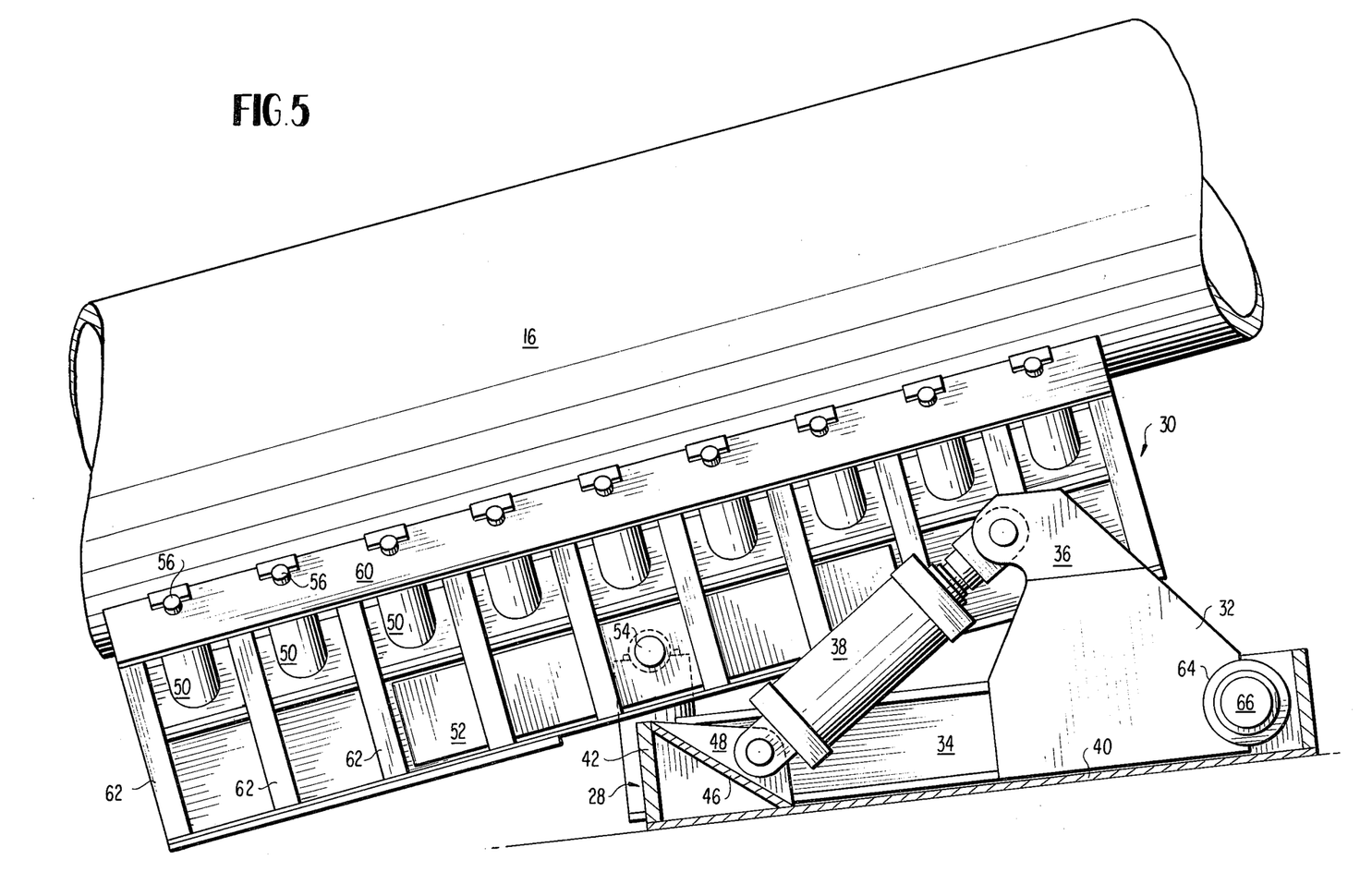
FIG. 5 is a sectional view taken along the line 5—5 of FIG. 3 illustrating a preferred embodiment of the support shoe in a lowered condition.

Referring briefly to FIGS. 3, 4, and 5, it can be appreciated that the support shoe of the invention preferably includes a low profile, generally rectangular frame 28 which is employed to connect the shoe to the surface of the ramp. The support shoe also includes a cradling means in the form of a generally V-shaped cradle 30 perhaps best illustrated in FIGS. 4 and 6. The cradle 30 serves to support the pipeline in longitudinally movable relation with the ramp as the pipeline is being laid. The cradle is pivotally connected to the frame 28 through elongated pivoting means in the form of a bell crank 32.

The bell crank 32 is formed of limbs 34 and 36 which are rigidly connected to one another. At the junction of the limbs the bell crank is pivotally connected to the frame 28. Similarly, at the end of limbs 34 the cradle 30 is pivotally connected thereto. Rotating means in the form of at least one hydraulic piston and cylinder assembly is pivotally connected at the end of the remaining limbs 36 of the bell crank and extends to a pivotal connection with the frame 28.

Preferably, two piston and cylinder assemblies are provided and extension and contraction thereof serves to rotate the bell crank about the pivotal connection with the frame. Rotation of the bell crank serves to raise and lower the cradle 30 relative to the ramp. The cradle is illustrated in a raised condition in FIG. 4 and in a lowered condition in FIG. 5. It can be readily appreciated from a comparison of these FIGS. that the elevation at which the support shoe adjustably supports a pipeline 16 is a function of the extension or contraction of the piston and cylinder assemblies 38.

The Frame

Referring now in more detail to FIG. 3, it can be seen that the frame 28 is of a generally U-shaped configuration. The frame includes a base plate 40 and an upstanding peripheral flange 42. The peripheral flange projects inwardly into the open portion of the U in a manner tending to close the open end of the frame. However, the upstanding peripheral flanges do not actually meet so that the support shoe can assume a fully lowered condition. The upstanding peripheral flanges are reinforced by bosses 44 near the closed portion of the frame and are thus strengthened to permit a pivotal connection between the bell crank and the frame. Triangular downwardly and inwardly sloping webs 46 are disposed in the corners formed by the upstanding peripheral flange near the open end of the frame. These webs support brackets 48 which afford a pivotal connection between the frame and the hydraulic piston and cylinder assemblies 38.

It should be emphasized at this point that the frame 28 rests upon but does itself not penetrate the surface of the ramp. This quality is perhaps best illustrated in FIGS. 4 and 5. It should be apparent that the support shoe according to the present invention is modular in the sense that it can be applied directly to the surface of the ramp without the need for modifications to the configuration of the ramp or the associated supportive structure. Furthermore, the character of the frame permits loads exerted on the support shoe by the pipeline to be distributed into the ramp in a manner avoiding or minimizing stress concentrations, cyclic or otherwise.

The Cradle

Figure 6:
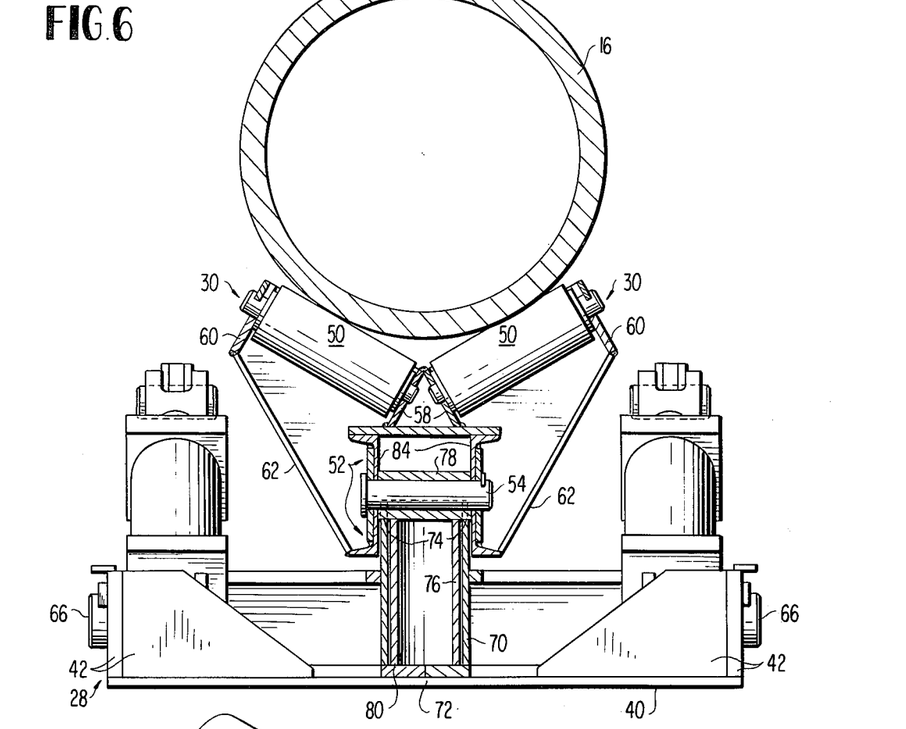
FIG. 6 is a sectional view taken along the line 6—6 of FIG. 3 showing a preferred embodiment of the support shoe in a lowered condition and further illustrating the structure of the joint between the cradle and remaining portions of the support shoe.

Referring now to FIGS. 3, 4, and 6 it can be appreciated that the cradle 30 supports the pipeline 16 in longitudinally movable relation with the ramp. This is perhaps most clearly illustrated in FIG. 6. As illustrated therein, the cradle contacts the pipeline intermediate the longitudinal axis thereof and the surface of the ramp. Preferably, the cradle supports the pipeline in longitudinally rolling relation through a plurality of rollers 50 oriented to form a trough or cradle and contacting the pipe in the lowermost sector. A yoke 52 extends downwardly from the trough formed by the rollers and embraces a cylindrical pivot pin 54 to connect the cradle 30 to the bell crank 32. Because of the pivotal connection between the cradle and the bell crank and the pivotal connection between the bell crank and the frame 28, the cradle enjoys two degrees of freedom relative to the ramp. This permits the cradle to float or pivot as the pipeline flexes and the curvature thereof changes.

The rollers 50 forming the trough of the cradle are each connected to the yoke 52 through an axle 56 and a crown angle 58 through which an end of each axle passes. The end of each axle 56 opposite that extending through the crown angle 58 passes through side flanges 60 which extend along the length of the cradle as perhaps best illustrated in FIGS. 3,4, and 5. The side flanges are connected to the yoke and braced relative thereto by a plurality of bracing strips periodically placed along the length of the cradle. The rollers 50, yoke 52, crown angle 58, side flanges 60, and bracing strips 62 thus form a rigid structure on which the pipeline 16 can rest and move along as it is being placed on the floor of the body of water. It should be emphasized at this point that other suitable cradles could be used as long as the basic structural configuration is not violated. For instance, rather than employing rollers, a support shoe according to the invention could employ tracks.

The Bell Crank

The bell crank or other suitable lever or elongated pivoting means is employed to alternately raise and lower the cradle relative to the ramp. FIGS. 4 and 5 illustrate two of the various raised and lowered conditions of the cradle which are possible. It can be readily appreciated from either of these FIGURES that the bell crank is comprised of limbs 34 and 36 which are rigidly connected to one another. The junction of the limbs comprises first extremity of the bell crank which is pivotally connected to the frame 28 of the support shoe and ultimately to the surface of the ramp. The particular manner in which the junction of the two limbs is pivotally connected to the frame is perhaps best illustrated in FIG. 3.

From this Figure it can be appreciated that the bell crank includes an elongated axle 64 which extends between the bosses 44 reinforcing the upstanding peripheral flanges 42. A small amount of clearance is provided between the bosses and the ends of the elongated axle to permit free rotation of the axle. Cylindrical pivot pins 66 extend from a short distance within the ends of the elongated axle 64 through the bosses 44 and the upstanding periperhal flanges 42. The pivot pins can be retained in place in any suitable manner.

FIG. 3 also illustrates quite well that the bell crank is comprised of an A-frame. The base of the A-frame is formed by the elongated axle 64 and the apex is formed by the intersection of the limbs 34 of the bell crank. As can be appreciated from an examination of FIGS. 3 and 4, the intersection of the limbs 34 forming the apex of the A-frame constitutes a second extremity of the bell crank. The second extremity of the bell crank pivotally supports the cradle 30. It can be well appreciated at this point that the A-frame affords a rigid triangular structure capable of resisting lateral movement of the pipeline in a direction transverse to the ramp of the lay barge. A support shoe according to the invention is therefore capable of accurately positioning the pipeline in a lateral sense at the various stations along the ramp and is not so subject to buckling.

As illustrated in FIG. 3, the bell crank includes two limbs 36 which do not intersect, but which instead extend in a generally upright direction in planes parallel to one another. The uppermost ends of these limbs each form a third extremity of the bell crank. The end of each limb 36 is pivotally connected to one end of an hydraulic piston and cylinder assembly, the opposite end of this assembly being pivotally connected to the frame 28.

As illustrated in FIG. 4, the limbs 34 and 36 of the bell crank intersect to form an acute angle relative to one another. It should be apparent from the illustration that the limbs 34 are considerably longer than the limbs 36. It can be further appreciated that each piston and cylinder assembly is pivotally connected to the shorter limb and forms an acute angle therewith. As a result of the relative length of the limbs of the bell crank and the manner in which the piston and cylinder assemblies are connected to the shorter limbs, the degree of rotation or movement of the apex of the A-frame is at least a whole number multiple of the degree of rotation or movement of the ends of the shorter limbs connected to the piston and cylinder arrangements. In other words, the motion of the piston and cylinder assemblies in extending or contracting is amplified by the bell crank to effect a greater change in position of the pipeline 16 as it rests on the cradle 30. As a result, piston and cylinder assemblies of shorter length may be employed.

Rotation of the Bell Crank

Suitable rotating means must be provided to rotate the bell crank 32 about the pivotal connection with the frame 28 formed by the elongated axle 64 and pivot pins 66 and to concurrently adjustably support the pipeline relative to the ramp of the lay vessel. As suggested earlier, the preferred rotating means is comprised of dual hydraulic piston and cylinder assemblies, each connected between a third extremity of the bell crank, i.e., the end of a limb 36, and a bracket 48 extending from the frame 28. It thus can be well appreciated at this point that the frame interconnects the bell crank and the piston and cylinder assemblies with the surface of the ramp in such a way that no adaptation of the ramp or the associated supportive structure thereof need be made.

The pivotal manner in which the piston and cylinder assemblies are connected to the bell crank and the frame and the orientation of the assemblies relative to the bell crank and frame result in the piston and cylinder assemblies being loaded only in an axial sense. No bending moments of any significance are introduced into the assemblies incident to the drag of the pipeline 16 on the cradle 30. Bending stresses in the assemblies are thus minimized and the vulnerability of the assemblies to buckling is substantially reduced.

In operation, the piston and cylinder assemblies are caused to extend or contract in response to hydraulic fluid forced through the conduits 68 into the cylinder on one side or the other of the piston. As the piston and cylinder assemblies are activated to extend or contract and exert forces intermediate the ends of the limbs 34 forming the A-frame, the A-frame is raised or lowered. Movement of the A-frame, of course, moves the cradle. Thus, manipulation of the hydraulic piston and cylinder assemblies affords adjustment to the elevation of the pipeline relative to the ramp of the lay barge.

It should be emphasized at this point that the bell crank and more particularly the A-frame can be rotated in any desired manner. As an example, a gear could be applied to the elongated axle 64 and could be rotated by a pinion gear operably associated with a suitable motor. Likewise, a screw jack could be employed to exert the necessary forces intermediate the ends of the limbs forming the A-frame to raise and lower the cradle.

The Connection Between the Cradle and the Bell Crank

As indicated earlier, a great deal of force must be transmitted from the cradle 30 into the A-frame. A rugged joint is therefore necessary between these two elements of the support shoe. The fact that the joint must be pivotal and at the same time amenable to convenient servicing and repair complicates the matter. According to the invention, these problems are approached by providing a pivotal joint of the type illustrated in FIGS. 6 and 7.

Figure 7:
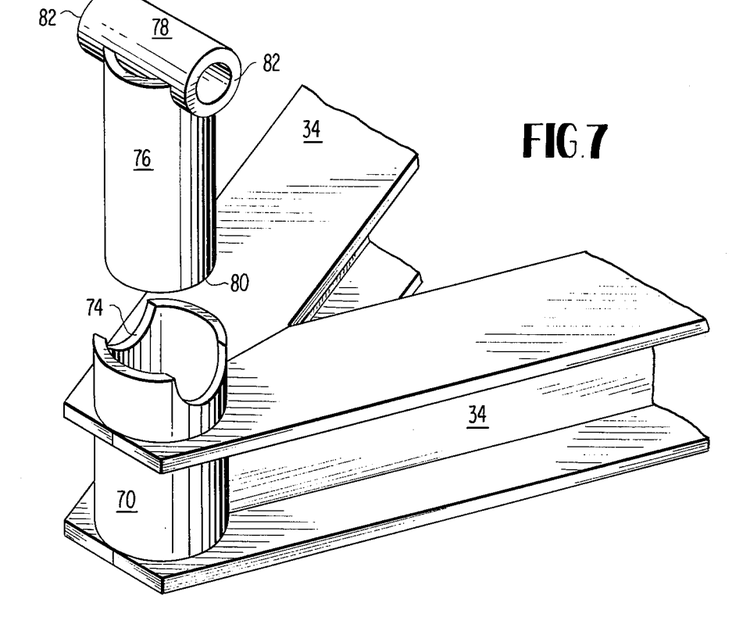
FIG. 7 is a fragmentary, perspective, exploded view of the apex of the A-frame of the preferred support shoe of the present invention and the sleeve and bearing carried thereby.

As perhaps best illustrated in FIG. 7, the joint includes a cylindrical post 70 which is rigidly connected to the apex of the A-frame in a manner orthogonal to the plane thereof. The cylindrical post is tubular and is closed at the end opposite the cradle by a cap 72 formed by portions of the limbs 34. The remaining end of the cylindrical post is arcuately configured as illustrated in FIG. 7 to form arcuate bearing surfaces 74. The bearing surfaces 74 are intended to carry the cylindrical pin 54 as illustrated in FIG. 6.

A sleeve 76 is received within the interior of the cylindrical post in relatively close telescoping relation therewith. The sleeve carries a cylindrical bearing in such a manner that the arcuate outer surfaces of the bearing mate with the arcuate bearing surfaces 74 of the cylindrical post while the end 80 concurrently bears against the cap 72 formed by portions of the limbs 34.

As illustrated in FIG. 6, the pivot pin 54 extends through and is embraced by the yoke 52. In extending through the yoke 52 the pivot pin also extends through the interior of the bearing 78. Thus, forces exerted by the pipeline through the cradle can be transmitted into the A-frame by the pivot pin as it bears against the interior of the bearing 78 and as the bearing 78 and sleeve 76 concurrently bear against the arcuate bearings surfaces 74 and the cap 72 of the cylindrical post 70.

It should be noted from FIG. 6 that the pivot pin 54 and bearing 78 are oriented perpendicular to the longitudinal axis of the pipeline 16. Furthermore, the ends 82 of the bearing 78 relatively closely contact the inner surfaces of the side wall 84 of the yoke 52. This close association help ensure that the cradle 30 is centered relative to the ramp of the lay barge and remaining portions of the shoe.

It should be emphasized as well that the pivot pin 54 and the sleeve 76 and bearing 78 permit the joint to be readily disassembled for convenient repair or replacement.

SUMMARY OF THE MAJOR ADVANTAGES

It will be appreciated that in providing a novel method and apparatus for adjustably supporting a pipeline relative to the ramp of a lay barge that certain significant advantages are obtained.

A major advantage resides in the fact that no opening need be formed in the ramp of a lay vessel to accommodate the support shoe of the present invention. Thus, no shipping of water occurs and workmen are afforded convenient access to the various elements of the support shoe.

According to the novel method and apparatus of the invention, another advantage is afforded in that a pipeline can be supported relative to the ramp of a lay vessel without introducing any but axial loads into hydraulic piston and cylinder assemblies employed to raise and lower the pipeline.

The invention affords still another advantage in that the A-frame thereof provides a rigid structure which serves to support the pipeline. The rigidity of the A-frame restrains the pipeline in a lateral sense so as to afford accurate lateral positioning of the pipeline with minimal opportunity for failure of the supportive structure.

A further advantage resides in the fact that the extent to which the elevation of the pipeline above the ramp of the lay barge is changed by the invention is, at least, a whole number multiple of the extent to which the element powering the change must move.

The fact that the invention distributes loads exerted by the pipeline to the ramp in a manner diminishing or largely eliminating stress concentrations affords a still further advantage.

Yet another advantage is provided by the modular character of the invention since the support shoe can be applied directly to the ramp of the lay vessel without penetrating or otherwise requiring any adaptation of the ramp or the associated supportive structure.

The joint between the cradle and remaining portions of the invention affords sufficient bearing area for the pivot pin that undue wear can be avoided. The joint further ensures that the cradle is centered relative to the ramp and that the entire joint can be easily repaired or replaced and thus provides yet still other advantages.

In describing the invention, reference has been made to a preferred embodiment. However, those skilled in the art and familiar with the disclosure of the invention may recognize additions, deletions, substitutions, or other modifications which would fall within the purview of the invention as defined in the claims.

What is claimed is:

1. In a pipe laying apparatus including
   a floating lay vessel,
   a ramp extending generally longitudinally of the lay vessel and carried thereby,
   a pipeline portion superposed on said ramp, and
   a shoe carried by said ramp and adjustably supporting a portion of said pipeline on said ramp,
   said shoe including cradling means for supporting the pipeline in longitudinally movable relation with the ramp, said cradling means simultaneously contacting opposite side portions of the underside of said pipeline;
   the improvement in said shoe comprising:
   elongated pivoting means, extending at least in part generally longitudinally of said ramp, for alternately raising and lowering said cradling means relative to the ramp, aaid elongated pivoting means being pivotally connected by first pivot means to the surface of the ramp and by second pivot means to said cradling means;
   said first and second pivot means being mutually displaced longitudinally of said ramp, with said elongated pivoting means extending therebetween and defining a lifting lever arm extending between said ramp and said cradling means; and
   rotating means for rotating said lifting lever arm about said first pivot means to support said pipeline relative to the ramp of the lay vessel;
   said cradling means, said lifting lever arm, and said rotating means being disposed entirely above, and not penetrating said ramp.

2. A shoe for adjustably supporting a pipeline relative to a ramp of a lay vessel, said shoe comprising:
   cradling means for supporting the pipeline in longitudinally movable relation with the ramp, said cradling means contacting the pipeline intermediate the longitudinal axis thereof and the surface of the ramp;

elongated pivoting means for alternately raising and lowering said cradling means relative to the ramp, said elongated pivoting means being pivotally connected at a first extremity to the surface of the ramp and at a second extremity to said cradling means; and rotating means for rotating said elongated pivoting means about said pivotal connection with the ramp to support the pipeline relative to the ramp of the lay vessel;

said rotating means comprising at least one hydraulic piston and cylinder assembly pivotally connected at one end to the ramp and at the other end to a third extremity of said elongated pivoting means; and said elongated pivoting means comprising a bell crank having two limbs rigidly connected to one another, the junction of said limbs comprising said first extremity, the remaining end of one limb comprising said second extremity, and the remaining end of the other limb comprising said third extremity.

3. A shoe for adjustably supporting a pipeline as defined in claim 2 wherein:

said cradling means, said pivoting means, and said rotating means are disposed entirely above and do not penetrate the surface of the ramp of the lay vessel.

4. A shoe for adjustably supporting a pipeline as defined in claim 2 wherein:

said limbs are connected at said junction to form an acute angle relative to one another;

said limb connected to said at least one hydraulic piston and cylinder arrangement is substantially shorter in length than said limb connected to said cradling means; and said at least one piston and cylinder assembly is connected to said limb to form an acute angle therewith.

5. A shoe for adjustably supporting a pipeline as defined in claim 4 wherein:

said bell crank is comprised of an A-frame, the base thereof comprising said first extremity and the apex thereof comprising said second extremity.

6. A shoe for adjustably supporting a pipeline as defined in claim 2 wherein:

said bell crank is comprised of an A-frame, the base thereof comprising said first extremity and the apex thereof comprising said second extremity.

7. A shoe for adjustably supporting a pipeline as defined in claim 6 further comprising:

a low profile, generally rectangular frame interconnecting said bell crank and said at least one hydraulic piston and cylinder assembly with the ramp, the base of said frame distributing to the ramp loads imposed thereon by and through said bell crank and said at least one piston and cylinder assembly.

8. A shoe for adjustably supporting a pipeline as defined in claim 7 wherein:

said frame, said cradling means, said pivoting means, and said rotating means comprise a unit mountable directly on the surface of the ramp of the lay vessel.

9. A shoe for adjustably supporting a pipeline as defined in claim 7 wherein said pivotal connection of said apex of said A-frame to said cradling means is comprised of:

a cylindrical post rigidly connected to said apex in an orthogonal manner relative to the plane of said A-frame;

a cylindrical pin carried by an end of said cylindrical post perpendicular to the longitudinal axis of the pipeline; and a yoke extending downwardly from said cradling means to embrace said cylindrical pin and pivotally connect said cradling means to said A-frame.

10. A shoe for adjustably supporting a pipeline as defined in claim 9 wherein:

said cylindrical post is tubular, having the end opposite said cradling means closed and the end adjacent said cradling means arcuately configured to receive and carry said cylindrical pin; and said pivotal connection of said apex of said A-frame to said cradling means is further comprised of:

a bearing surrounding a portion of said cylindrical pin;

a sleeve carrying said bearing and said cylindrical pin, said sleeve being telescopable within said cylindrical post to bear against said closed end of said cylindrical post and to position said bearing in bearing relation with said arcuately configured end of said cylindrical post.

* * * * *